Dec. 21, 1954   G. F. GARDNER   2,697,393
TRACTOR HITCH MECHANISM
Filed Jan. 2, 1953   4 Sheets-Sheet 1
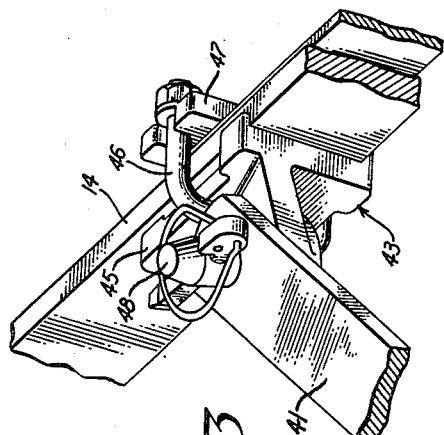
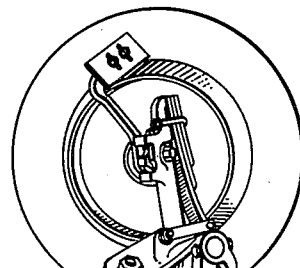
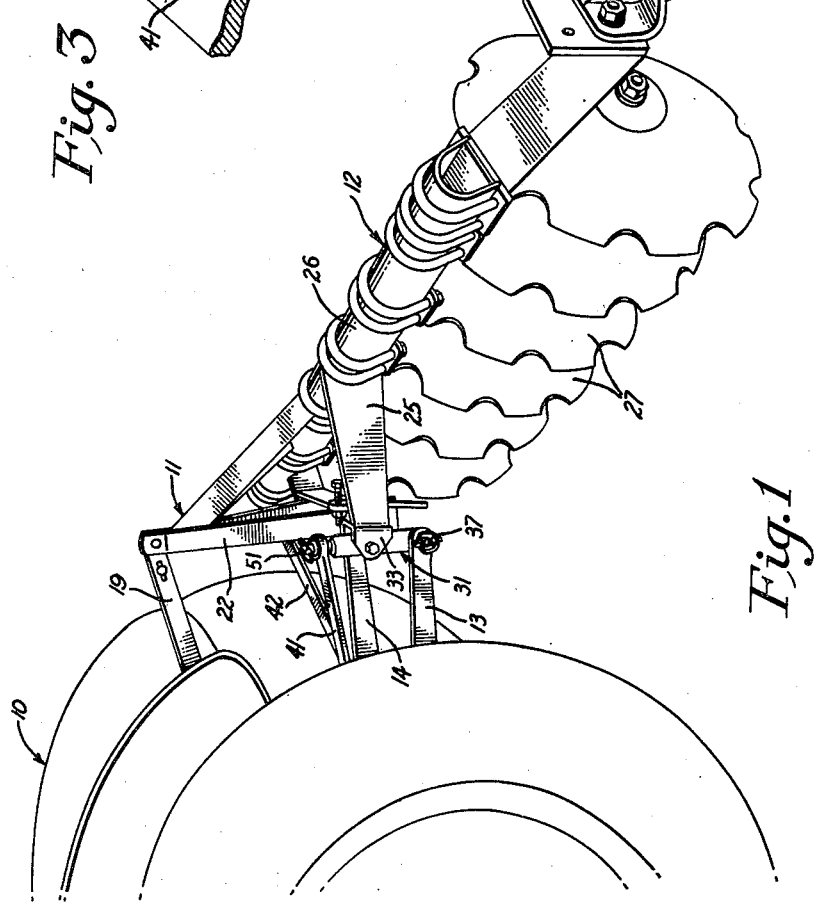
INVENTOR.
GUY F. GARDNER
BY
Carlson, Pitzner, Hubbard & Wolfe
ATTORNEYS.

Dec. 21, 1954

G. F. GARDNER 2,697,393

TRACTOR HITCH MECHANISM

Filed Jan. 2, 1953

INVENTOR.
GUY F. GARDNER
BY
*Carlson, Pitzner, Hubbard + Wolfe*
ATTORNEYS

Dec. 21, 1954  G. F. GARDNER  2,697,393
TRACTOR HITCH MECHANISM.
Filed Jan. 2, 1953  4 Sheets-Sheet 3

INVENTOR.
GUY F. GARDNER
BY
Carlson, Pitzner, Hubbard + Wolfe
ATTORNEYS.

Dec. 21, 1954      G. F. GARDNER      2,697,393

TRACTOR HITCH MECHANISM

Filed Jan. 2, 1953      4 Sheets-Sheet 4

INVENTOR.
GUY F. GARDNER
BY
Carlson, Pitzner, Hubbard & Wolfe
ATTORNEYS.

United States Patent Office 2,697,393
Patented Dec. 21, 1954

2,697,393

TRACTOR HITCH MECHANISM

Guy F. Gardner, Dearborn, Mich., assignor to Harry Ferguson, Inc., Detroit, Mich., a corporation of Delaware Application January 2, 1953, Serial No. 329,189

5 Claims. (Cl. 97—47.66)

The present invention relates to tractor hitches, and more particularly to a hitch mechanism for use with a pair of laterally swingable draft links.

It is an object of the present invention to provide an improved hitch mechanism for attachment to the draft links of a tractor employing the well-known Ferguson System. It is a more specific object to provide an improved hitch mechanism which produces horizontal skewing of the tool bar and connected implement in response to lateral swinging movement of the draft links when the tractor turns to the right or to the left. It is another object to provide a hitch mechanism which causes articulation of the implement relative to the tractor when making a turn, causing the implement to steer behind the tractor when making short turns, for example, at the end of a furrow.

It is a further object of the invention to provide a mechanism of the above type in which interference with the tractor rear axle housing is avoided both during normal working of the implement and when the implement is upraised during transport. It is a still further object to provide a mechanism in which unbalanced forces are largely eliminated, resulting in longer life of the bearing surfaces and more economical construction. It is an object to provide a hitch mechanism which may readily be installed on the draft links of a tractor employing the Ferguson System and which may be easily and quickly removed. It is an object of the invention in one of its more detailed aspects to provide a hitch mechanism in which the degree of articulation or steering is conveniently adjustable to adapt the mechanism to various types of implements.

Finally, it is an object to provide a hitch mechanism which may be economically manufactured, which is durable in operation and flexible in use. Other objects and advantages will be apparent upon reading the attached detailed description and upon reference to the drawings, in which:

Figure 1 is a side view in perspective of the improved hitch mechanism showing the manner in which the mechanism is connected to the tractor and attached implement.

Fig. 3 is a fragmentary view showing the manner in which the auxiliary links are connected to the draft links.

Figure 2:
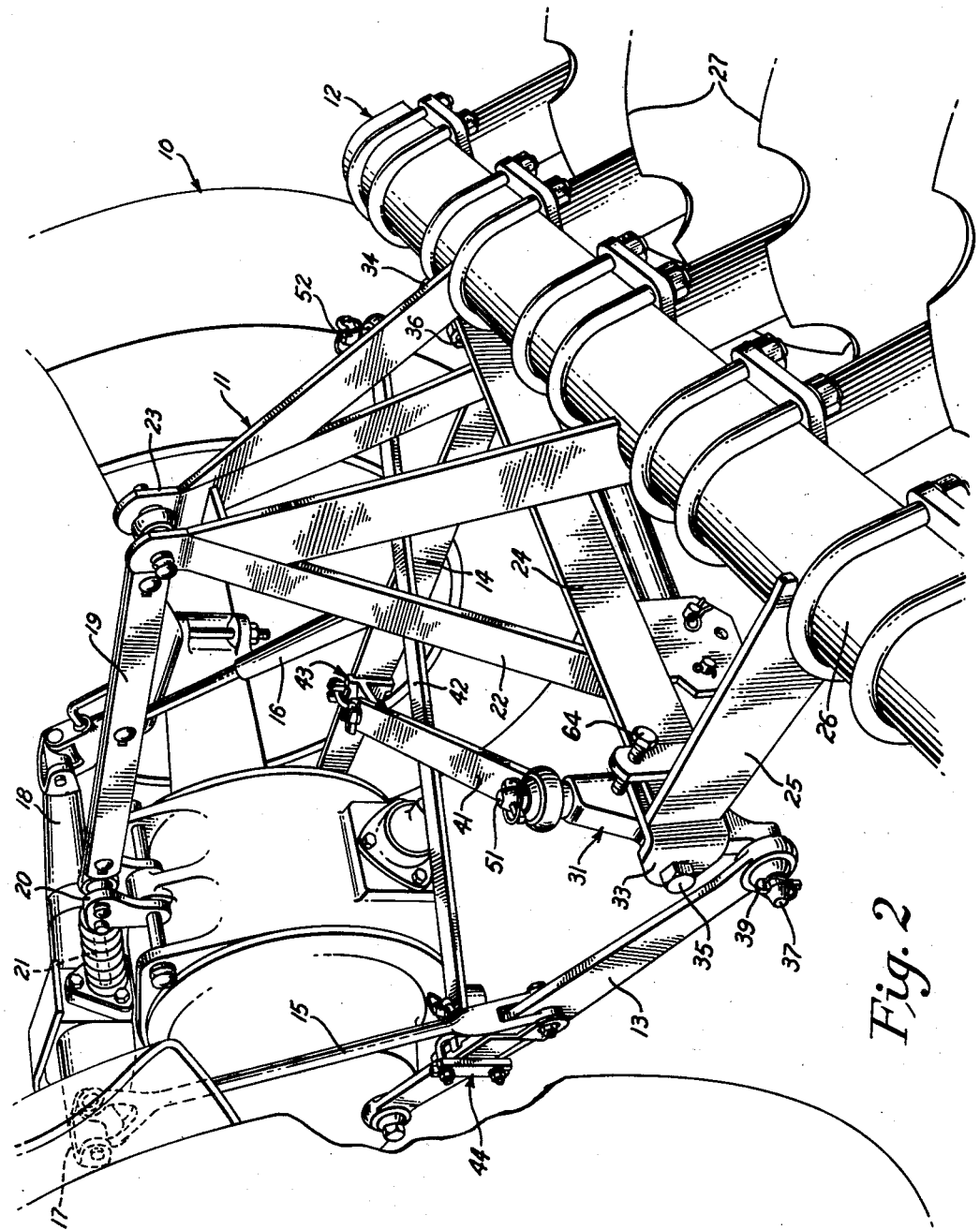
Fig. 2 shows the improved hitch mechanism in perspective.

While the invention is susceptible of various modifications and alternative constructions, there is shown in the drawings and will herein be described in detail the preferred embodiment and an alternative embodiment, but it is to be understood that it is not intended to limit the invention to the forms disclosed but it is intended to cover all modifications and alternative constructions falling within the spirit and scope of the invention as expressed in the appended claims.

Referring now to Fig. 1 of the drawings, the tractor is indicated in outline at 10, the hitch mechanism at 11 and the connected implement at 12. The tractor will be recognized as employing the well-known Ferguson System which is described in detail in Ferguson Patent 2,118,180. Connected at the rear end of the tractor under the rear axle are a pair of horizontally spaced, laterally swingable draft links 13, 14. In accordance with the teachings of Ferguson Patent 1,916,945, the links are arranged convergently having an effective center of pivoting lying in the region of the front axle. The draft links 13, 14 are supported by drop links 15, 16, respectively, which are connected to lift arms 17, 18.

At the top of the rear axle housing is a top link or compression link 19 which is connected at its forward end to shackle 20, which in turn presses upon a control rod 21. In accordance with the teachings of the Ferguson Patent 2,118,180, hydraulic means are provided internally of the tractor to support the draft links 13, 14 and the connected implement at an elevation determined by the force exerted upon the top link 19, thereby to accomplish "depth control." The hitch mechanism 11 includes an A-frame 22 having a top portion 23 and a draw bar 24. Extending rearwardly from the draw bar 24 is a bracket 25 which is, in turn, welded to a tool bar 26. The latter, which forms a part of the implement 12, carries a series of discs 27. It will be appreciated by one skilled in the art that the present invention, although described in connection with a disc harrow, is equally applicable to other types of implements.

In practicing the invention, a pair of cranks 31, 32 are interposed between the A-frame and the trailing ends respectively of the draft links and pivoted for fore and aft rocking movement. Thus the crank 31 is pivoted at its central portion in a clevis 33 at the left hand side of the A-frame while the crank 32 is centrally pivoted in a similar clevis 34 at the right hand side of the A-frame. In the present instance pivoting occurs about horizontal bolts 35, 36 respectively. Mounted at the bottom of the crank member 31 and projecting laterally outward is a draft pin 37 for receiving the trailing end of the draft link 13. The draft pin is kept in place by a linch pin 39. It will be understood that a similar draft pin 38 and linch pin 40 are provided for the crank 32 at the right hand side of the A-frame.

For the purpose of producing horizontal skewing of the A-frame and connected implement when the tractor executes a turn, cross links 41, 42 are provided. These links are arranged in X formation in the space between the draft links 13, 14. Taking the cross link 41 by way of example, it is connected at its rear end to the upper end of crank 31 and extends angularly forward for anchoring to the opposite draft link 14. Similarly, cross link 42 is connected at its rear end to the top of crank 32 and extends angularly forward for anchoring to the forward portion of the draft link 13. Anchoring to the draft links is provided by U-bolt assemblies 43, 44 respectively, the construction of which is set forth in Fig. 3. The U-bolt assembly 43, by way of example, has a pad 45 which lies flatly along the inner surface of the draft link 14. The pad is maintained in place by a U-bolt 46 which engages a plate 47. The pad is further provided with a pin 48 which is received in a socket provided at the front end of the cross link 41. A pivot pin connection is also provided at the rear ends of the cross links 41, 42. As shown in the drawings, the pins indicated at 51, 52 are mounted vertically on the cranks 31, 32 respectively.

Figure 4:
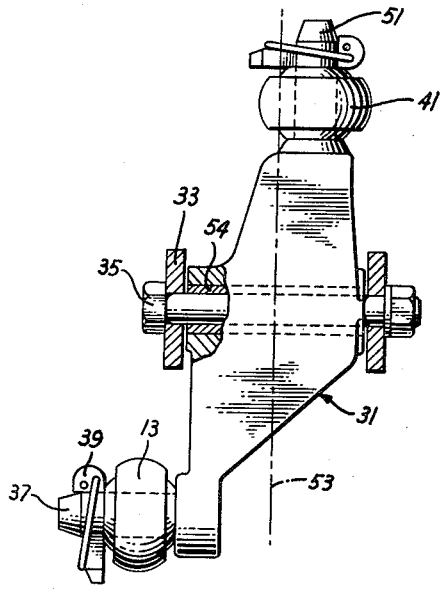
Fig. 4 shows one of the crank members used in the present invention.

In accordance with the present invention, the cross links 41, 42 are connected to the cranks 31, 32 at points which lie substantially inside of the trailing ends of the lower draft links. Further in accordance with the invention the points of connection of the cross link and lower draft link respectively are arranged on opposite sides of the crank bearing surface. Turning to Fig. 4, it will be noted that the pin 51, to which the cross link 41 is connected lies to the right of the median line 53 of the bearing 54 while the draft pin 37 lies to the left of such median line. The advantages brought about by this arrangement are two-fold. In the first place, the forces applied to the bearing 54 are balanced so that a much narrower bearing may be employed than would otherwise be possible. This may be fully appreciated by analyzing the torques which are exerted about the median line 53 under normal running conditions. The draft load on crank 31 is, of course, shared by the draft link 13 and the cross link 41. Consequently, forces are applied to both the pin 37 and pin 41 in a direction which is forward or "into" the drawing. Since the torque exerted at pin 51 is counterclockwise and that exerted at 37 is clockwise about the line 53, it will be apparent that the forces are largely balanced. This effectively prevents any tendency of the bearing to "bell" or "flange."

Figure 5:
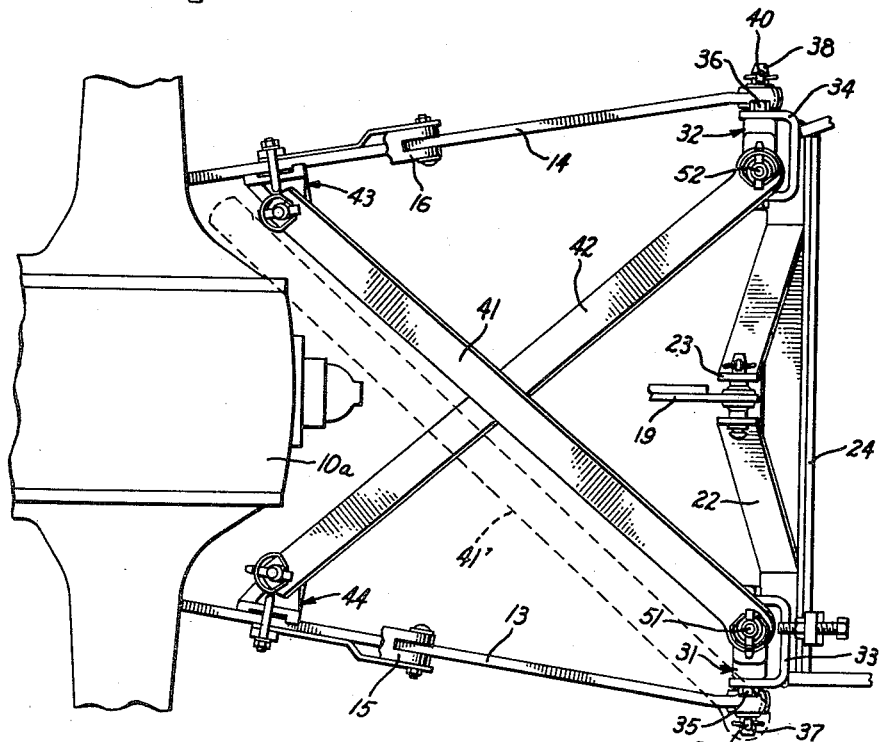
Fig. 5 is a plan view of the hitch mechanism showing the clearance at the rear axle housing.

A further advantage of offsetting the point of connection of the cross link inwardly is brought out in Fig. 5. Here it will be noted that the cross link 41 is anchored on the forward portion of the draft link 14. At its rear end the cross link 41 extends to the pin 51 which is offset inwardly from the draft pin 37. The same remarks apply to the companion link 42. As a result, the tractor axle housing indicated at 10a is safely "cleared" both in the normal running position of the hitch linkage and also when the hitch linkage is upraised for transport. Clearance is preserved by the present arrangement even when the draft links swing to the right or left incident to making a turn. It will be seen that such clearance is lost when the cross link 41 occupies a more conventional position shown in dotted outline at 41'.

While the operation of the hitch mechanism will be apparent from the foregoing, it will be helpful to review it briefly. Under normal straight driving conditions the linkage occupies the position shown in Fig. 5. Upon making a turn to the left the implement normally resists the turning movement and consequently the draft links 13, 14 swing to the left relative to the tractor. It will be noted that when the draft links swing to the left there is a tendency for the cross link 41 to pull forwardly on the crank 31. This causes the left hand side of the implement to move towards the tractor. Conversely, there is a tendency for the draft link 42 to push backwardly on the crank member 32. This causes the right hand side of the implement to move rearwardly away from the tractor. This skewing movement of the implement is reversed when the tractor turns toward the right. In either case the degree of articulation between implement and tractor is much greater than that which would be produced by the links 13, 14 acting alone and the implement can thus follow the tractor through a relatively sharp turn.

The effect of the foregoing is to move the center of pivoting of the draft links from the region of the front axle to the region of the rear axle. The side draft of the implement is in the present invention therefore applied to the rear axle thereby reducing the effect of side draft upon steering of the tractor.

Figure 6:
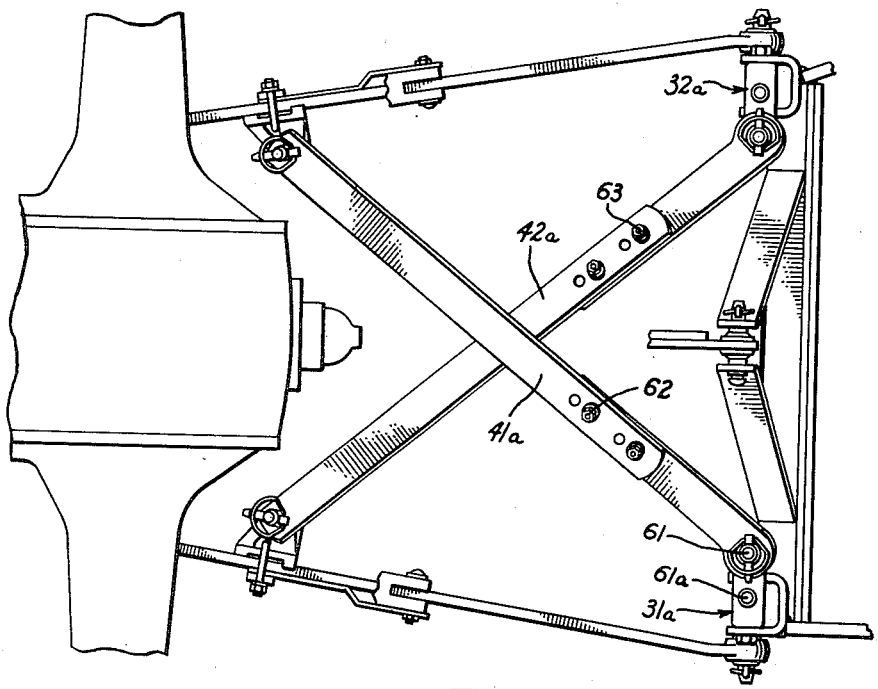
Fig. 6 is a plan view of a modified construction including provision for adjustment.
Figure 7:
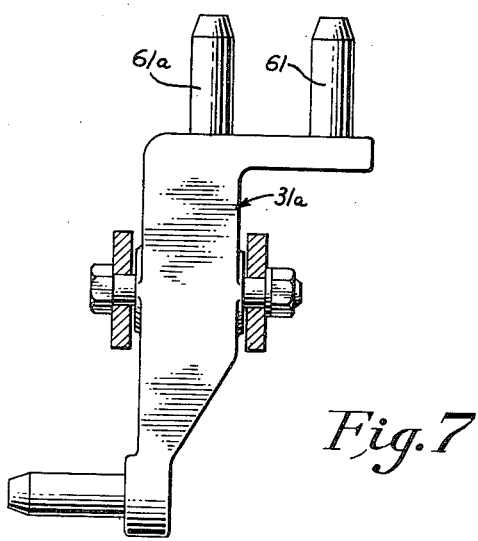
Fig. 7 is a crank member used in the form of the invention shown in Fig. 6.

In accordance with one aspect of the invention the effectiveness of the mechanism may be varied to accommodate different types of implements. This is accomplished by the adjustment shown in the embodiment disclosed in Figs. 6 and 7. Here corresponding elements bear corresponding reference numerals with the subscript a. Thus, the crank 31a is provided with a second pin 61a in addition to the pin 61. The cross link 41a may, as a result, be selectively engaged with two pins to vary the degree of skewing of the implement. The pin 61 is used when reduced skewing is desired and when the implement exerts a lesser degree of side draft than the disc harrow shown. In order to maintain the cranks 31a, 32a, vertical under normal running conditions the cross links 41a, 42a, are provided with an adjustment 62, 63 respectively. The length of the cross links is determined simply by adjusting the degree of overlapping. It will be apparent to one skilled in the art that the length of the cross links may be varied by other means than that shown without departing from the present invention.

When using the present hitch with the disc harrow in unusually hard ground, there is a tendency for the implement to swing to the right and to skew with respect to the tractor to the extent that the width of the furrow is reduced. Where such reduction is undesirable, an adjustable stop 64 (Fig. 2) may be placed in the path of movement of the crank 31 thereby limiting the skewing to any desired degree.

I claim as my invention:

1. A draft hitch for use with a tractor having a pair of horizontally spaced and laterally swingable draft links trailingly pivoted thereon comprising, in combination, an implement frame, crank members on opposite sides of said frame and having their center portions pivoted in said frame for fore and aft rocking movement about a common axis, said crank members being arranged generally vertically and having draft pins at their lower ends for respective pivoting engagement with the trailings ends of the tractor draft links, and a pair of cross links arranged in "X" formation between said draft links, said cross links being pivoted at their rear ends to the upper ends respectively of the crank members and having means for anchoring their forward ends to the forward ends respectively of the draft links, the points of pivoting connection at the rear of said cross links being offset inwardly from said draft pins.

2. A draft hitch for use with a tractor having a pair of horizontally spaced and laterally swingable draft links trailingly pivoted thereon comprising, in combination, an implement frame, crank members on opposite sides of said frame and having their center portions pivoted in said frame for fore and aft rocking movement about a common axis, said crank members being arranged generally vertically and having horizontally arranged draft pins at their lower ends for respective pivoting engagement with the trailing ends of the tractor draft links, and a pair of cross links arranged in X formation between said draft links, said cross links having means at their forward ends for anchoring to the forward portion of the respective draft links, and said cranks having vertically arranged pivot pins for engaging the rear ends of said cross links respectively.

3. A draft hitch for use with a tractor having a pair of horizontally spaced and laterally swingable draft links trailingly pivoted thereon comprising, in combination, an implement frame, crank members pivoted on opposite sides of said frame and each having a central horizontal bearing surface providing fore and aft rocking movement, said crank members being arranged generally vertically and having draft pins at their lower ends located outwardly of the median line of the associated bearing surface for pivoting engagement with the trailing ends of the tractor draft links, and a pair of cross links arranged in X formation between said draft links, said cross links being respectively pivoted to the upper ends of the crank members at points lying inwardly of the median line of said bearing surface, and said cross links having means for anchoring their forward ends to the forward ends respectively of the draft links.

4. A draft hitch for use with a tractor having a pair of horizontally spaced and laterally swingable draft links trailingly pivoted thereon comprising, in combination, an implement frame, crank members on opposite sides of said frame and having their center portions pivoted in said frame for fore and aft rotation about a common axis, said crank members being arranged generally vertically and having draft pins at their lower ends respectively for pivoting engagement with the trailing ends of the tractor draft links, and a pair of cross links arranged in X formation between said draft links, said cross links having means at their forward ends for anchoring to the forward portion of the draft links respectively, said cranks each having an upper portion which is offset laterally inward and which provides a series of laterally spaced connection points selectively engageable by the rear ends of the cross links.

5. A draft hitch for use with a tractor having a pair of horizontally spaced and laterally swingable draft links trailingly pivoted thereon comprising, in combination, an implement frame, clevises on opposite sides of said frame, crank members centrally pivoted in the respective clevises for fore and aft rotation about a common axis, said crank members being arranged generally vertically and having draft pins at the lower ends thereof for respective pivoting engagement with the trailing ends of the tractor draft links, and a pair of cross links arranged in X formation between said draft links, said cross links having their rear ends pivoted to the upper ends respectively of the crank members and having means for anchoring their forward ends to the forward ends respectively of said draft links.

References Cited in the file of this patent

FOREIGN PATENTS

| Number | Country | Date |
| --- | --- | --- |
| 556,793 | Great Britain | Oct. 21, 1943 |